Oct. 31, 1967     P. H. HOFER ET AL     3,350,487
METHOD FOR MOLDING PLASTIC ARTICLES
Original Filed Aug. 13, 1964
2 Sheets-Sheet 1
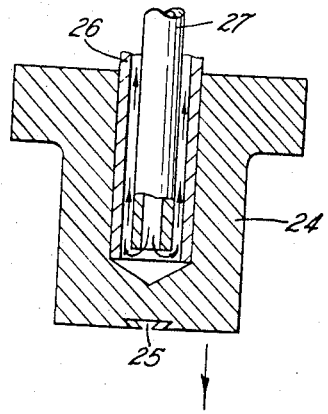
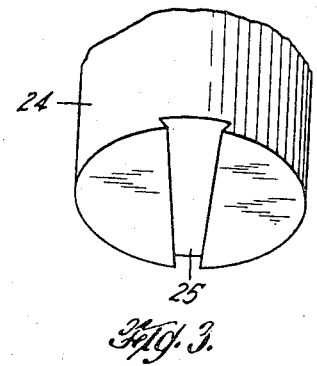
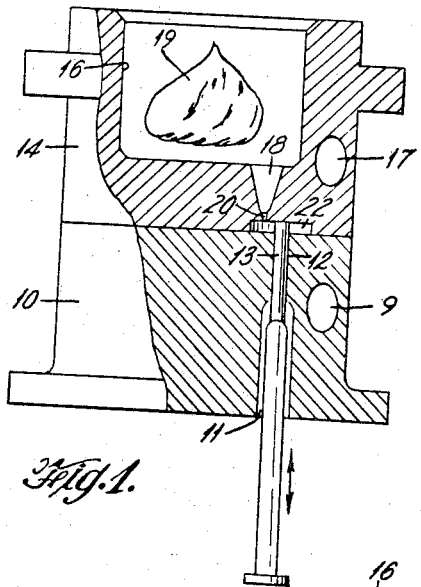
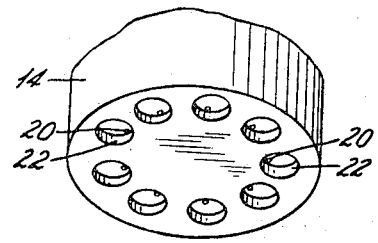
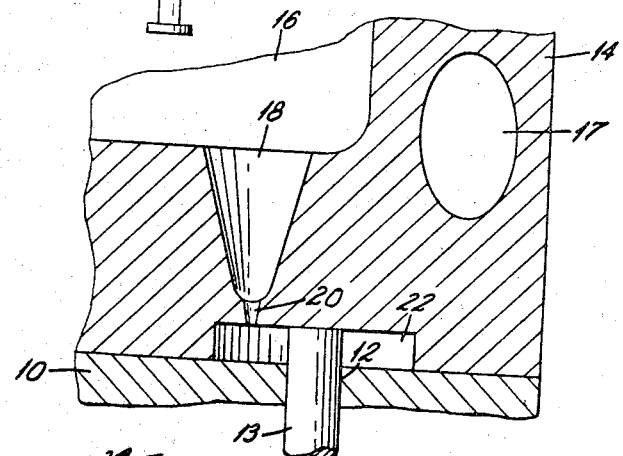
INVENTORS
PETER H. HOFER
HERBERT A. SWALLOW
BY
ATTORNEY Oct. 31, 1967

P. H. HOFER ET AL 3,350,487

METHOD FOR MOLDING PLASTIC ARTICLES

Original Filed Aug. 13, 1964

INVENTORS
PETER H. HOFER
HERBERT A. SWALLOW

BY

ATTORNEY

United States Patent Office 3,350,487
Patented Oct. 31, 1967

3,350,487
METHOD FOR MOLDING PLASTIC ARTICLES
Peter H. Hofer, Berkeley Heights, and Herbert A. Swallow, North Branch, N.J., assignors to Union Carbide Corporation, a corporation of New York
Original application Aug. 13, 1964, Ser. No. 389,254. Divided and this application Nov. 29, 1966, Ser. No. 597,587
1 Claim. (Cl. 264—161)

This application is a devision of copending application Ser. No. 389,254, filed Aug. 13, 1964.

This invention relates to the melt compression molding of plastic articles. More particularly, this invention relates to an imprived method for melt compression molding spru-free plastic articles. Even more particularly, this invention relates to an improved method for melt compression molding sprue-free apertured plastic articles such as coaxial cable spacers.

Melt compression molding whereby a metered charge or pellet of molten plastic material is formed by pressure between matching die halves into a molded article, suffers from several drawbacks. For example, the weight of the charge of molten plastic material must be exactly equal to the weight of the article to be molded otherwise incomplete molding or flash formation takes place. Consequently the use of ultra precise metering devices is required. Furthermore, one charge is generally only molded into one article which limits the versatility and efficiency of melt compression molding. In those instances where it is desired to mold clear articles such as a flashlight lens, melt compression molding is unsuitable because the outline of the charge or pellet becomes visible in the molded articles. Furthermore, if the pellet is not placed in the exact center of the mold, characteristic "half-moons" appear in the molded article. These effects can be somewhat minimized by increasing the temperature of the plastic charge, but this only introduces problems of handling the sticky charge and mitigates against the advantages gained through melt compression molding.

Another specific problem that has existed for some time relates to the molding of apertured plastic articles such as coaxial cable spacers where dimensional and electrical property tolerances are at a minimum and high-speed, efficient production is an economic necessity. For example, in 50 miles of coaxial cable, there are 3,168,000 washer-shaped cable spacers generally made from polyethylene. Consequently, an electrical or dimensional defect in each spacer would be greatly amplified and could render the finished coaxial cable useless. Hot molding processes are generally unsuitable for making such apertured articles because they tend to introduce a dimensional or property defect in the molded article or they are not capable of high speed production rates. For instance, injection molding processes are notorious for leaving a sprue on a molded article which cannot be tolerated in a coaxial cable spacer or similar article. Cold forming techniques, such as stamping or cutting coaxial cable spacers from plastic sheets, are limited because they require high maintenance, ultra precision dies and result in the formation of large amounts of scrap. Furthermore, a spacer produced by cold forming has tapered sides and holes and is contaminated by "feathers" or fines which are created during the forming operation. These loosely adhering particles jam assembly machinery and cause electrical defects to appear in the finished cable.

It is an object of this invention to provide an improved method for melt compression molding sprue-free plastic articles and sprue-free apertured plastic articles.

It is another and highly specific object of this invention to provide an improved method and apparatus for melt compression molding coaxial cable spacers within tolerable dimensional and property limits.

The present invention will be further understood from the following description taken in conjunction with the accompanying drawings wherein—

FIGURE 1 is a view partly in elevation and partly in section of apparatus suitable for carrying out the instant method for molding.

FIGURE 2 is a perspective view of the bottom of the upper mold of the apparatus shown in FIGURE 1.

FIGURE 3 is a perspective view of the bottom of the piston of the apparatus shown in FIGURE 1.

FIGURE 4 is an enlarged view of a portion of the apparatus shown in FIGURE 1.

Figure 5:
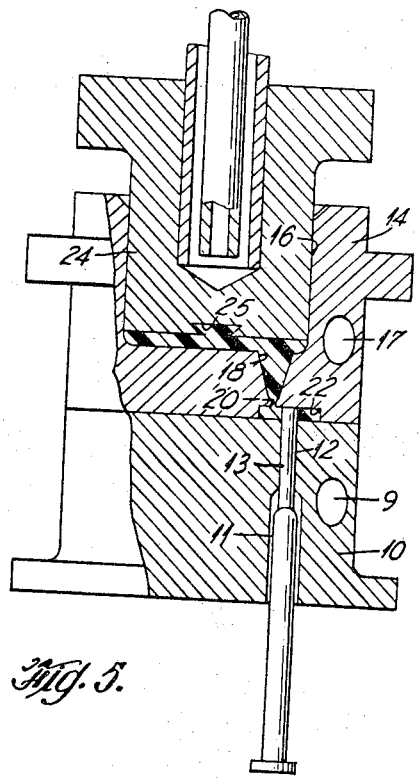
FIGURES 5 and 6 are views of the apparatus shown in FIGURE 1 showing the relative positions of the apparatus components during two stages of the molding cycle.

The method of this invention for molding a sprue-free plastic article broadly comprises supplying a metered charge of molten plastic material to a transfer cylinder, applying a primary force to the plastic material to cause it to flow through and fill a sprue forming channel and to completely fill a mold cavity in communication therewith, cooling the plastic material in the mold cavity while simultaneously applying a secondary force such that plastic material continues to flow through the sprue forming channel to compensate for shrinkage of the cooling plastic material in the mold cavity, cooling the plastic material in the sprue forming channel in the absence of positive pressure after shrinkage of the plastic material in the mold cavity is substantially complete, thereafter separating the sprue so formed from the plastic material in the mold cavity before the plastic material immediately underlying the sprue is cooled and removing the sprue-free molded article so formed from the mold cavity. If desired, a sprue-free plastic article can be molded having an aperture therein by providing aperture forming means extending into a mold cavity and withdrawing the same prior to removing the molded article from the mold cavity.

As indicated above, the drawings illustrate apparatus which is adapted for producing coaxial cable spacers. It is for purposes of convenience only that the following description and drawings are specifically directed to the molding of coaxial cable spacers from polyethylene. It will be obvious to those skilled in the art that many modifications and changes can be made in the method of this invention without departing from the spirit and scope thereof. It will also be obvious that a wide variety of plastic articles of all shapes and sizes, with or without apertures or inserts therein, can be molded according to the present invention.

Specifically referring to FIGURES 1 through 4, the preferred apparatus of this invention is shown to include a lower mold portion 10 having a recess 11 and a cylindrical passageway 12 adapted to receive a reciprocative aperture forming pin 13. Surmounting the lower mold portion 10 is an upper mold portion 14 having a transfer cylinder 16, a passageway 18 in communication therewith, and a sprue forming channel 20 in communication with the passageway 18 and a mold cavity 22 which is cooperatively defined by the mold portions 10 and 14. As is more clearly shown in FIGURE 2, the mold portions 10 and 14 can cooperatively define a plurality of mold cavities 22 all of which have a passageway 18 and a sprue forming channel 20 by means of which each of the mold cavities 22 is in communication with the transfer cylinder 16. In the drawings, the orifices 20′ of the sprue forming channels are shown to be positioned off center so as not to interfere with the aperture forming pins 13.

The passageway 18, more clearly shown in FIGURE 4, progressively decreases in cross section from the cylinder 16. This shape for the passageway 18 is conveniently employed to insure ease of separation of a cooled plastic material therefrom. The sprue forming channel 20 is shown in FIGURE 4 to be smaller than and to progressively decrease in cross section from the passageway 18 (that is the maximum diameter of channel 20 is less than the minimum diameter of passageway 18 as is clearly shown in FIGURE 4). The configuration for the sprue forming channel 20 has a zero land, that is, there is no portion constant in cross section. For this reason, problems such as elongation of plastic material when removed from a portion of constant cross section are eliminated. For purposes of the present invention, the sprue forming channel 20 is also sufficiently small to cause a molten plastic material flowed therethrough to undergo molecular shear and thereby generate frictional heat. This unique feature eliminates pellet outlines and "half-moons" heretofore encountered with prior apparatus for melt compression molding. Furthermore, this feature also provides for good color dispersion and complete fillout of the mold cavity.

The mold portions 10 and 14 are conveniently provided with the internal conduits 9 and 17 respectively for purposes of circulating a cooling fluid therethrough to cool the mold portions.

Associated with the transfer cylinder 16 is transfer piston 24 having concentrically arranged conduits 26 and 27 for purposes of circulating a cooling fluid therethrough as indicated by the arrows in FIGURE 1. The face of piston 24 is also provided with a centrally located tapering dovetail slot 25 which extends across the bottom of the piston 24 as is more clearly shown in FIGURE 3. By means of the slot 25 excess cooled plastic material is removed from the upper mold portion 14 as is more fully described below.

Figure 6:
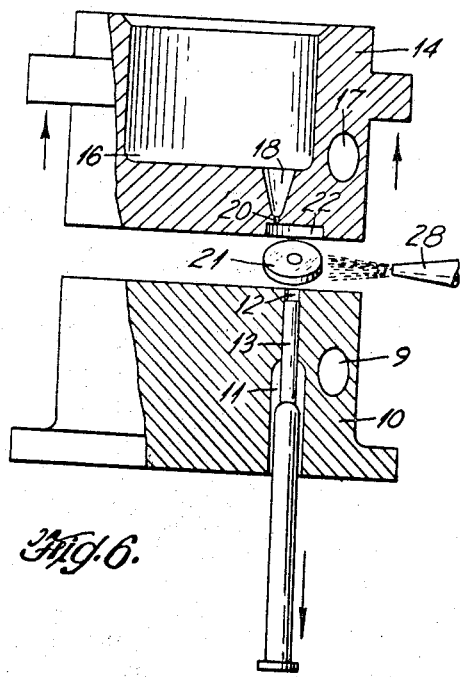

The operation of the apparatus shown in the drawings will be briefly described with particular reference to FIGURES 1, 5 and 6. Polyethylene is fluxed in a suitable extruder (not shown) and is conveyed thereby to a suitable metering pump (not shown). From the pump, the molten polyethylene is fed through a nozzle and cut off by a suitable mechanism and supplied to the transfer cylinder 16 as molten charge 19 as shown in FIGURE 1. The piston 24 is then slid by suitable means into the transfer cylinder 16 and is employed to apply a primary force to cause the molten charge of polyethylene to flow and fill the mold cavities 22, the sprue forming channels 20, the passageway 18, a portion of the transfer cylinder 16 and the dovetail slot 25 of the piston 24. When this filling is complete, as shown in FIGURE 5, the polyethylene in the mold cavities 22 is cooled while a secondary force, generally less than the primary filling force, is simultaneously applied by the piston 24 such that the molten polyethylene 19 continues to flow due to molecular shear through the sprue forming channels 20 to compensate for shrinkage of the cooling polyethylene in the mold cavities 22. In this manner a molded article which is a true reproduction of the mold cavity is insured. After shrinkage of the polyethylene in the mold cavities 22 is substantially completed, application of the secondary force by the piston 24 is terminated and the polyethylene in the sprue forming channels 20 is allowed to cool in the absence of positive pressure. Because the polyethylene in the sprue forming channels 20 is surrounded by the cool mold portion 14, sprues are formed before the polyethylene immediately underlying the sprues is completely cooled. This is due to the fact that the polyethylene underlying the sprues is more remote from the cooling mold portion 14 and hence will cool more slowly than the polyethylene in the sprue forming channels 20. The method of the present invention takes advantage of this phenomenon to produce a sprue-free spacer by separating the cooled sprues from the polyethylene in the mold cavities 22 before the polyethylene underlying the sprue is cooled. Since the uncooled polyethylene is weak compared to the cooled sprues, separation is accomplished with ease. The separation can take place at the exact upper surface of the mold cavities 22 but in practice when the sprues are separated from the polyethylene in the mold cavities 22, a small amount of polyethylene is separated with the sprues leaving a minute depression in the surface of the spacers which in no way is a dimensional defect in the spacer.

Polyethylene in the dovetail slot 25 is cooled by the piston 24 and provides the means whereby the above described sprue separation is accomplished when the piston 24 is withdrawn from the transfer cylinder 16. This is shown in FIGURE 6. The excess polyethylene or cullet 19' removed by the piston 24 is subsequently removed therefrom by a force applied to the edge of the cullet 19' which slides the same out of the dovetail slot 25. The cullet 19' can then be recycled to the extruder as desired.

For the purposes of this invention it is preferred that the center line of the tapering dovetail slot 25 coincide with a diameter line of the transfer piston 24 as is illustrated in FIGURE 3. When the slot 25 is so positioned, the cooling polyethylene will shrink toward this center line which will eliminate any binding between the polyethylene and the slot 25. In practice, that portion of cullet 19' in the slot 25 will be slightly smaller than the slot 25 because of shrinkage on cooling and consequently the cullet 19' can be removed from the slot with ease. It should also be understood that more than one slot positioned and shaped in such a manner so as to prevent binding on cooling can be employed.

After the piston 24 is retracted removing therewith excess polyethylene 19', the mold portions 10 and 14 are separated by suitable means, the aperture forming pins 13 are retracted by suitable means and the finished spacers 21 are removed conveniently by a blast of air from nozzle 28. This is shown in FIGURE 6. Because molten polyethylene will shrink towards the center when cooled, polyethylene in the mold cavities 22 will shrink onto the aperture forming pin 13. This behavior can best be utilized by first raising the upper mold portion 14 as shown in FIGURE 6. Because the spacers 21 have shrunk onto the pins 13, they are held in place and will separate with ease from the mold cavities 22. The pins 13 can then be retracted and the spacers 21 removed.

The ratio of the area of the face of the transfer piston to the area of the molded articles can range from about 4:1 to about 1:1.9 but for most all practical purposes it is in the range of from about 1:1 to about 1:1.9. The latter range is preferred for most applications since it provides a means of keeping waste down to a minimum and allows for the use of high forming pressures and hence more efficient operating rates.

From the foregoing, it will be obvious that the components of the apparatus shown in the drawings can be used in a molding cycle which comprises a coordinated series of timed operations. As such the apparatus of this invention is ideally suited for high-speed, efficient production of molded articles, sprue-free holded articles, and sprue-free apertured molded articles such as coaxial cable spacers and the like.

Several modifications of the apparatus shown in the drawings can be mentioned as being representative of modifications and changes which can be made within the scope of this invention. For example, the upper mold portion 14 may rest under the force of gravity on lower mold portion 10 or may be clamped thereon during the molding cycle. Also, suitable guide means may be utilized between the mold portion 10 and 14 and for the piston 24 to insure proper alignment.

The manner in which the mold portions 10 and 14 cooperate to define the mold cavities 22 may vary from that shown in FIGURE 1. For instance, the mold cavities may be intermediate the mold portions or entirely in the lower mold portion, the opposite of that shown in FIGURE 1. It is also to be understood that a separate plate may be employed between the mold portions 10 and 14 to define the sides of the mold cavities while the top and bottom thereof are defined by the upper and lower mold portions respectively. The use of such a plate makes it possible to vary the dimensions of the mold cavity without having to alter the other components of the mold. The phrase "upper mold portion" then is intended to encompass the use of such a separate plate to define a portion of the mold cavities.

As will be evident to those skilled in the art, the mold cavities 22 and the transfer piston 24 can be vented to insure complete distribution of the molten charge 19. Other means may also be employed to remove excess plastic material than the dovetail slot 25 illustrated in the drawings. Such means could be employed in such a manner as to reduce the amount of excess. However, the dovetail slot 25 has been found to be particularly useful because it takes advantage of the fact that as the plastic material cools, it shrinks towards the center of the slot thereby facilitating removal of the cullet 19′.

All normally solid thermoplastic resins which will flow under the influence of pressure when molten and which will undergo molecular shear when forced through a small area, such as the sprue forming channel 20, can be molded according to the present invention. Illustrative of such thermoplastics are polyolefins such as polyethylene and polypropylene, vinyl polymers, polystyrene, polycarbonates, polyethers such as polyhydroxyethers, polyarylene polyethers and the like, polyoxymethylenes, polyacrylates, adducts, interpolymers and mixtures thereof, and the like. Such thermoplastics can also contain conventional additives such as fillers, dyes, pigments, cross-linking agents, stabilizers, plasticizers, lubricants, antioxidants and the like.

The following examples are intended to further illustrate the present invention but not to limit the same in any manner.

Example 1

Apparatus similar to that shown in the drawings was used but having only one mold cavity and without the aperture forming means. Polystyrene was fluxed in an extruder and a metered amount was placed in the transfer cylinder and a transfer piston was subsequently inserted therein. The mold and piston were placed under a Schrader air press which was advanced forcing the polystyrene into the mold cavity. The molded article was cooled and the cullet removed as described above. In this manner an excellent quality flashlight lens free from pellet outlines and half-moons was produced. The above procedure was also followed to produce star shaped articles from polystyrene and polyethylene.

Example 2

Apparatus similar to that shown in the drawings was used to mold sprue-free coxial cable spacers. The ratio of the area of the face of the transfer piston to the area of the molded spacers was 1:1.3. Polyethylene having melt index of 0.2–0.4 gm./10 min. and a density of .91 .922 gm./cc. was fluxed and conveyed in a 1½″ Mode Plastic Machine Company extruder and conveyed to metering pump which metered the molten polym through a ⅝″ nozzle into a continuously extrudi molten rod. A reciprocating feeding and cutting mech nism was employed to cut a charge of molten polym from the nozzle and convey and deposit the charge in transfer cylinder. Retraction of the cutting mechanis; then signaled the start of the molding cycle. Coaxi cable spacers were then continuously molded as shown i FIGURES 1, 5 and 6 for a period of 50 minutes unde the following conditions.

| | |
|---|---|
| Temperature of molten polyethylene °C__ | 14 |
| Extruder back pressure p.s.i__ | 180 |
| Manifold back pressure p.s.i__ | 90( |
| Mold temperature °C__ | 1! |
| Transfer piston temperature °C__ | |
| Primary filling pressure p.s.i__ | 400( |
| Secondary filling pressure p.s.i__ | 500–100( |
| Duration of primary pressure second__ | 0.08 |
| Duration of secondary pressure and sprue cooling in absence of positive pressure do____ | 1.02 |
| Total molding cycle do____ | 1.10 |
| Air nozzle discharge pressure p.s.i__ | 80 |
| Duration of discharge second__ | 0.7 |

Spot checks throughout the 50 minute run indicated that the spacers were sprue free and without flash and otherwise satisfied dimensional and property specifications.

We claim:

Method for molding a sprue-free plastic article which comprises supplying a metered charge of molten plastic material to a transfer cylinder in an amount in excess of that required to mold said plastic article, applying a primary force to said molten plastic material sufficient to cause it to flow through and fill a sprue forming channel and to completely fill a mold cavity, cooling the plastic material in said mold cavity while simultaneously applying a secondary force such that molten plastic material continues to flow through said sprue forming channel to compensate for shrinkage of the cooling plastic material in the mold cavity, cooling the molten plastic material in the sprue forming channel in the absence of positive pressure, thereafter separating the sprue to formed from the plastic material in said mold cavity before the plastic material immediately underlying said sprue is cooled and removing the sprue-free molded article so formed from said mold cavity.

References Cited

UNITED STATES PATENTS

| | | | |
|---|---|---|---|
| 2,355,613 | 8/1944 | Wacker. | |
| 3,071,814 | 1/1963 | Guhhenheim | 264—329 |
| 3,174,187 | 3/1965 | Schriever | 264—161 |
| 3,265,797 | 8/1966 | Spaak | 264—328 |

ROY B. MOFFITT, *Primary Examiner.*